(12) United States Patent
Byun et al.

(10) Patent No.: US 12,486,710 B2
(45) Date of Patent: Dec. 2, 2025

(54) DOOR SYSTEM FOR OPENING AND CLOSING OPENING FOR ENTRANCE AND EXIT OF SENSOR FOR VEHICLES

(71) Applicant: HYUNDAI MOBIS CO., LTD., Seoul (KR)

(72) Inventors: Jae Sup Byun, Yongin-si (KR); Jang Ho Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 145 days.

(21) Appl. No.: 18/588,901

(22) Filed: Feb. 27, 2024

(65) Prior Publication Data

US 2025/0067110 A1 Feb. 27, 2025

(30) Foreign Application Priority Data

Aug. 23, 2023 (KR) ........................ 10-2023-0110611

(51) Int. Cl.
*G08B 21/00* (2006.01)
*E05F 15/635* (2015.01)

(52) U.S. Cl.
CPC ....... *E05F 15/635* (2015.01); *E05Y 2900/531* (2013.01)

(58) Field of Classification Search
CPC ..... E05F 15/635; E05F 15/655; E05F 15/649; E05Y 2900/531; E05Y 2201/686; E05Y 2201/71; E05Y 2999/00; B60R 2011/0082; B60R 2011/0092; B60R 2011/0094; G01S 17/931; G01S 7/4813

USPC ........................................... 340/5.72
See application file for complete search history.

(56) References Cited

U.S. PATENT DOCUMENTS

| 9,762,777 | B2* | 9/2017 | Dadeppo | G02B 27/0006 |
| 9,873,387 | B2* | 1/2018 | Da Deppo | B60R 11/04 |
| 10,040,406 | B2* | 8/2018 | Da Deppo | B60R 11/04 |
| 2015/0274089 | A1 | 10/2015 | Schütz | |
| 2015/0362731 | A1 | 12/2015 | Hack et al. | |
| 2022/0118912 | A1 | 4/2022 | Kim et al. | |

FOREIGN PATENT DOCUMENTS

| CN | 115489440 A | 12/2022 |
| KR | 10-2007-0023393 A | 2/2007 |
| WO | 2022/045882 A1 | 3/2022 |

OTHER PUBLICATIONS

Extended European Search Report dated Jul. 30, 2024, issued in corresponding European Patent Application No. 24159293.0.

* cited by examiner

*Primary Examiner* — Mark S Rushing
(74) *Attorney, Agent, or Firm* — MORGAN, LEWIS & BOCKIUS LLP

(57) ABSTRACT

An embodiment provides a door system for opening and closing an opening for entrance and exit of a sensor for vehicles, the door system including a housing configured to accommodate the sensor for vehicles therein and having an opening for entrance and exit of the sensor, a door configured to slide along a guide groove provided on the housing to open and close the opening, a door link unit configured to slide the door, and a gear unit configured to transmit power of an actuator to the door link unit.

8 Claims, 10 Drawing Sheets

DOOR SYSTEM FOR OPENING AND CLOSING OPENING FOR ENTRANCE AND EXIT OF SENSOR FOR VEHICLES

CROSS-REFERENCE TO RELATED APPLICATION

This application claims priority to and the benefit of Korean Patent Application No. 10-2023-0110611, filed on Aug. 23, 2023, in the Korean Intellectual Property Office, the disclosure of which is incorporated herein by reference in its entirety for all purposes.

BACKGROUND

1. Field of the Invention

The present invention relates to a door system for opening and closing an opening for entrance and exit of a sensor for vehicles.

2. Discussion of Related Art

With the development of vehicle technology, functions such as autonomous parking as well as autonomous driving are being demanded. In order to perform the functions, a need for sensors including a LiDAR, a RADAR, a camera, and the like is increasing.

In general, a sensor is mounted on structures such as a bumper or grill of a vehicle and detects objects or structures by sensing the front and rear of the vehicle.

However, since the sensor is mounted in a state of being exposed to the outside of the vehicle, foreign substances such as dust may attach to a surface when the vehicle is moving. Consequently, problems such as the accuracy of the sensor's measurement values being reduced and the surrounding environment itself not being recognized occur.

Therefore, there is a need to improve the problems.

SUMMARY OF THE INVENTION

The present invention is directed to providing a door system for preventing a sensor from being contaminated by deploying the sensor to the outside of a vehicle only when sensor operation is required, such as in an autonomous driving mode.

Problems to be solved by the present invention are not limited to those mentioned above, and other problems not mentioned will be clearly understood by those skilled in the art from the following description.

According to an aspect of the present invention, there is provided a door system for opening and closing an opening for entrance and exit of a sensor for vehicles, the door system including a housing configured to accommodate the sensor for vehicles therein and having an opening for entrance and exit of the sensor, a door configured to slide along a guide groove provided on the housing to open and close the opening, a door link unit configured to slide the door, and a gear unit configured to transmit power of an actuator to the door link unit.

The gear unit may include a first gear unit including a first shaft connected to the actuator and a first gear provided on the first shaft and a second gear unit including a second shaft disposed in parallel with the first shaft and a second gear provided on the second shaft and engaged with the first gear.

An outer circumferential surface of the first gear may be divided into an operating section in which first teeth are formed and an idling section in which a rim is formed, the second gear may include second teeth formed on an outer circumferential surface thereof and engaged with the first teeth and a contactor contacting the rim, and the rim and the contactor may be provided in structures that protrude radially from upper portions of the first teeth and the second teeth, respectively.

As the first gear rotates, the first teeth may engage with the second teeth in the operating section so that the second gear rotates, and the rim may be configured to contact the contactor and slide in the idling section so that the second gear does not rotate.

The rim may have an outer surface that protrudes and is curved in an arc shape, and the contactor may have an outer surface that is concave and curved in an arc shape.

The door link unit may include a pair of guide links, one ends of which are rotatably connected to one side and the other side of a bottom surface of the door and the other ends of which are provided with sliding pins and connected to a sliding groove provided in a lower portion of the housing, a connecting link having one end and the other end rotatably connected to the other ends of the pair of guide links, a first door driving link having one end connected to the second gear and rotating together with the second gear, and a second door driving link having one end rotatably connected to the other end of the first door driving link and the other end rotatably connected to the connecting link.

The sliding pin may be provided in a structure that protrudes downward from a lower surface of the guide link at the other end thereof.

The connecting link may be connected to an upper surface of the guide link at the other end thereof.

The second door driving link may convert a rotational movement of the first door driving link into a linear movement in conjunction with the connecting link.

The guide groove may include a first movement section straightly disposed in a left-right direction behind the opening and a second movement section curvedly extending in a front-rear direction from the first movement section toward the opening.

Figure 1:
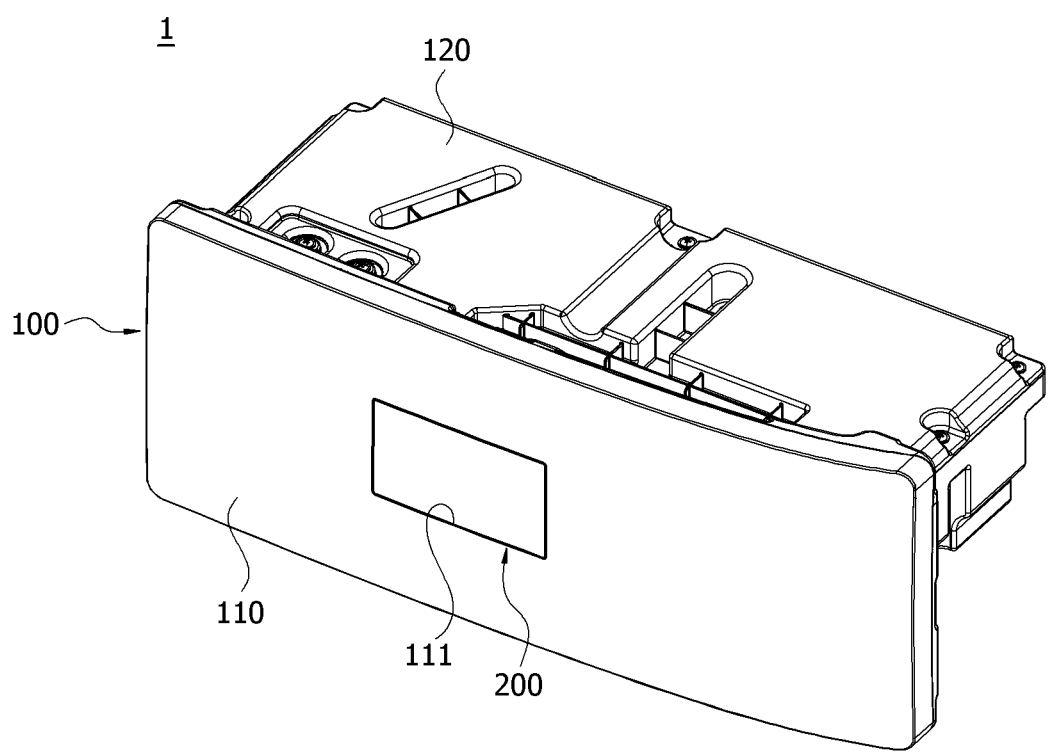
FIG. 1 is a view schematically illustrating a door system for opening and closing an opening for entrance and exit of a sensor for vehicles according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present invention will be described in detail with reference to the accompanying drawings, and components which are the same or correspond to each other will be denoted by the same or corresponding reference numerals in all drawings, and redundant descriptions will be omitted.

FIGS. 1 to 8 schematically illustrate a configuration of a door system for opening and closing an opening for entrance and exit of a sensor for vehicles according to an embodiment of the present invention.

A door system 1 for opening and closing an opening for entrance and exit of a sensor S for vehicles according to an embodiment of the present invention may be installed in a structure of a vehicle (not illustrated). For example, the door system 1 may be installed on the back of a vehicle's grill, bumper cover, or the like.

In the present embodiment, the sensor S may include a LiDAR, a RADAR, a camera, or the like. The sensor S may be responsible for detecting a surrounding environment of the vehicle in a vehicle's autonomous driving mode.

Referring to the drawings, the door system 1 may include a housing 100, a door 200, a door link unit 300, and a gear unit 400.

Figure 2:
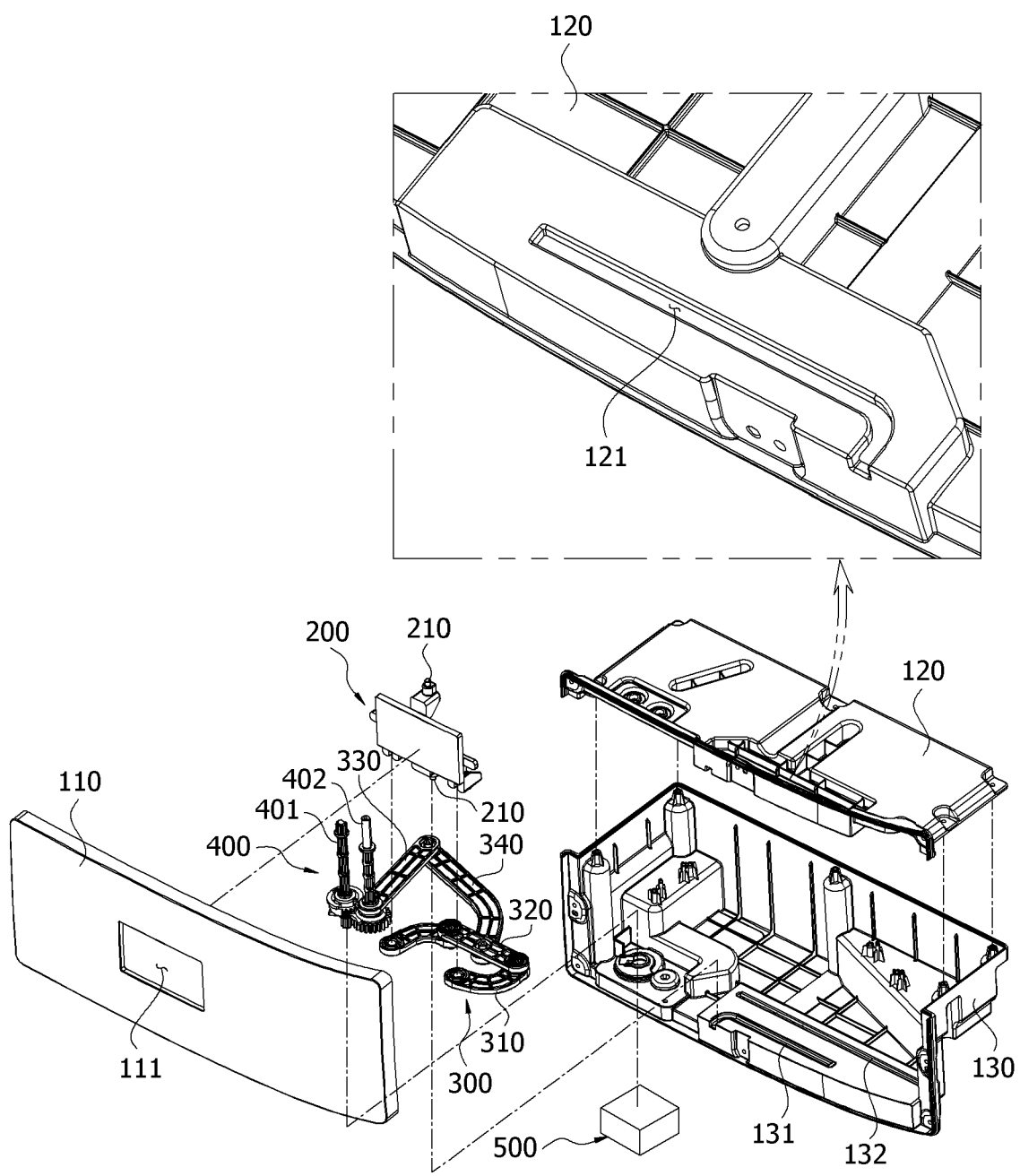
FIG. 2 is a view schematically illustrating a configuration of the door system for opening and closing the opening for entrance and exit of the sensor for vehicles.
Figure 3:
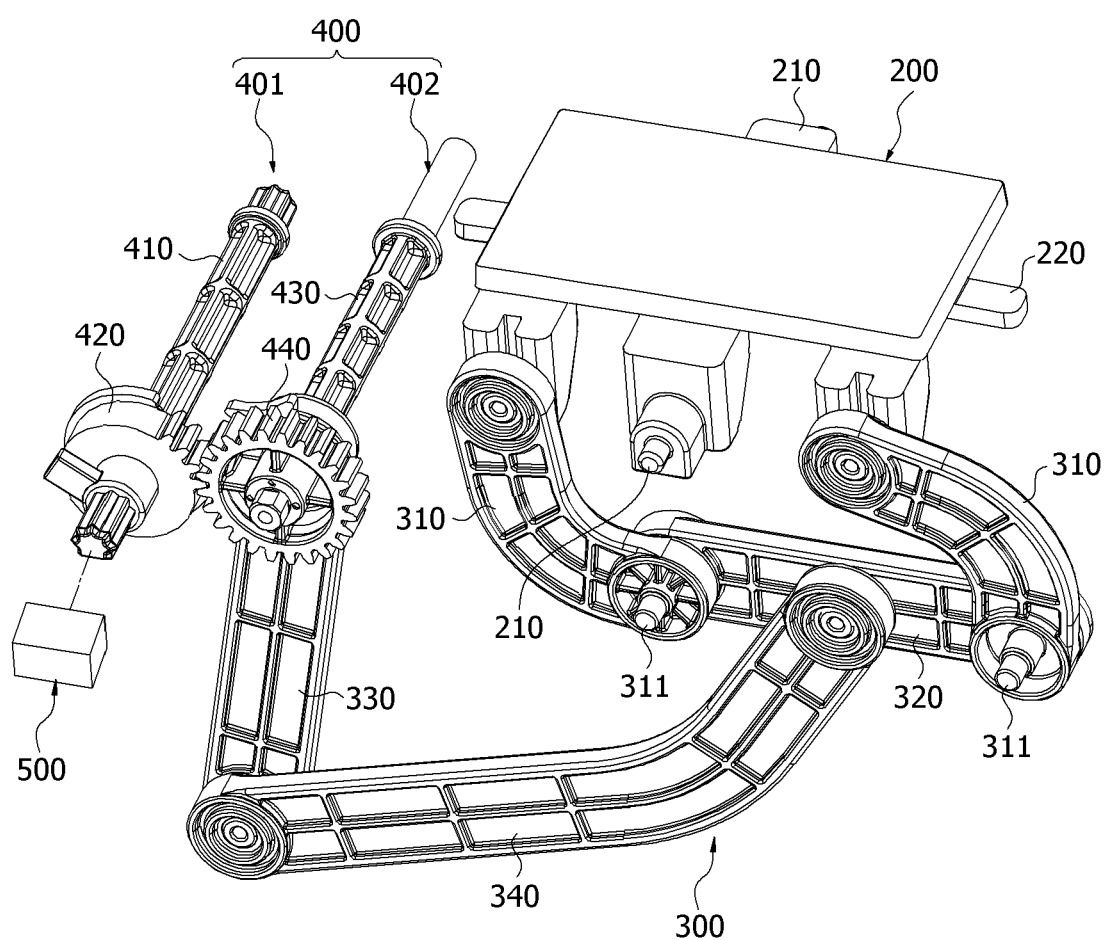
FIG. 3 is a view schematically illustrating a door link unit and a gear unit connected to a door.
Figure 4:
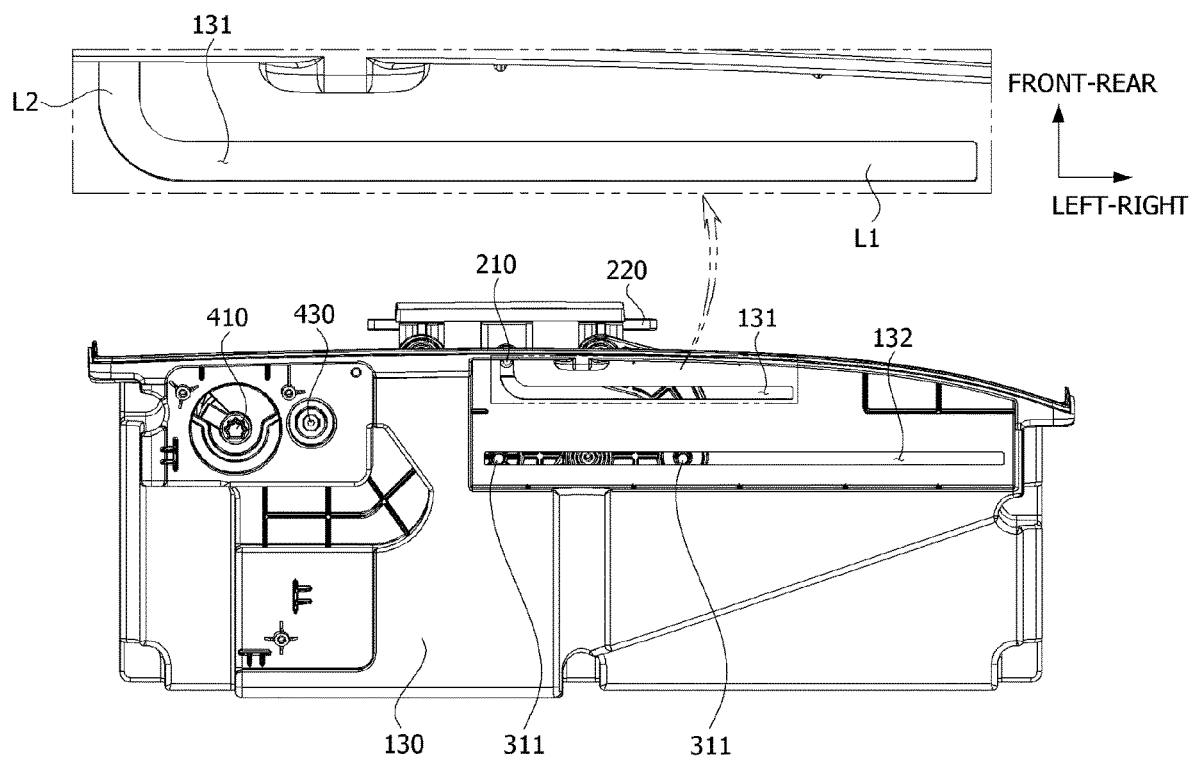
FIG. 4 is a view schematically illustrating a lower cover of a housing including guide grooves and a sliding groove.

As illustrated in FIGS. 2 and 3, the housing 100 may have an approximately box-shaped structure with an internal space. The door 200, the door link unit 300, and the gear unit 400 may be accommodated together with the sensor S in the internal space.

An opening 111 for entrance and exit of the sensor may be formed in a front cover 110 that is a front of the housing 100. In addition, guide grooves 121 and 131 may be formed in an upper cover 120 and a lower cover 130 of the housing 100, respectively.

The guide grooves 121 and 131 may include a first movement section L1 straightly disposed in a left-right direction behind the opening 111 and a second movement section L2 curvedly extending in a front-rear direction from the first movement section L1 toward the opening 111.

In addition, a sliding groove 132 may be formed in the lower cover 130. The sliding groove 132 may be provided in a structure extending straight from the rear of the first movement section L1 and parallel to the first movement section L1.

The housing 100 may be installed on the grill or bumper cover in a structure in which the opening 111 is exposed through the grill or bumper cover.

The door 200 may be disposed inside the housing 100 together with the sensor S, and may be configured to be alternately disposed at the opening 111.

That is, when the vehicle is not in an autonomous driving mode, the sensor S is accommodated inside the housing 100 and the opening 111 is closed by disposing the door 200 at the opening 111, so that the sensor S is prevented from being contaminated or damaged by external foreign substances. Then, when the vehicle is switched to the autonomous driving mode, the door 200 opens the opening 111, and the sensor S accommodated inside the housing 100 is disposed at the opening 111 to be deployed to the outside through the opening 111.

The door 200 is disposed in the housing 100 and configured to slide along the guide grooves 121 and 131 to selectively open or close the opening 111.

Referring to the drawings, the door 200 may have guide pins 210 connected to the guide grooves 121 and 131 on upper and lower surfaces, respectively.

The guide pins 210 may be provided in a structure that protrudes from the upper and lower surfaces of the door 200, respectively, and the door 200 may slide along a trajectory provided by the guide grooves 121 and 131 through the guide pins 210.

Figure 5:
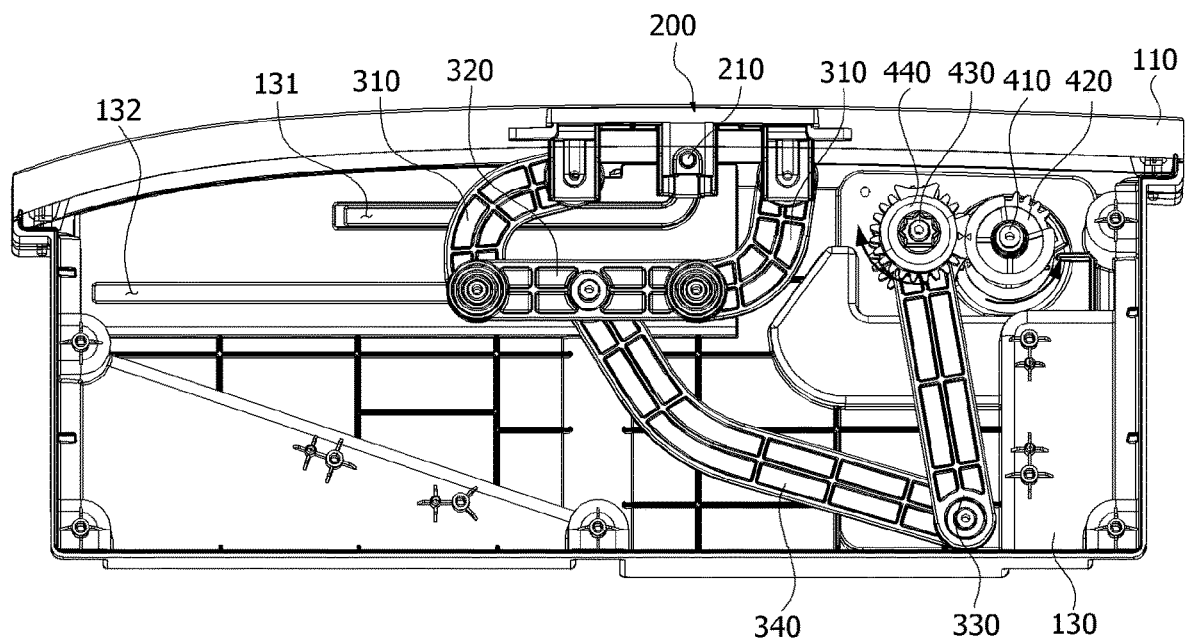
FIGS. 5 and 6 are views schematically illustrating a state in which the door closes an opening and a state in which the door opens the opening, respectively, by operation of the door link unit.
Figure 6:
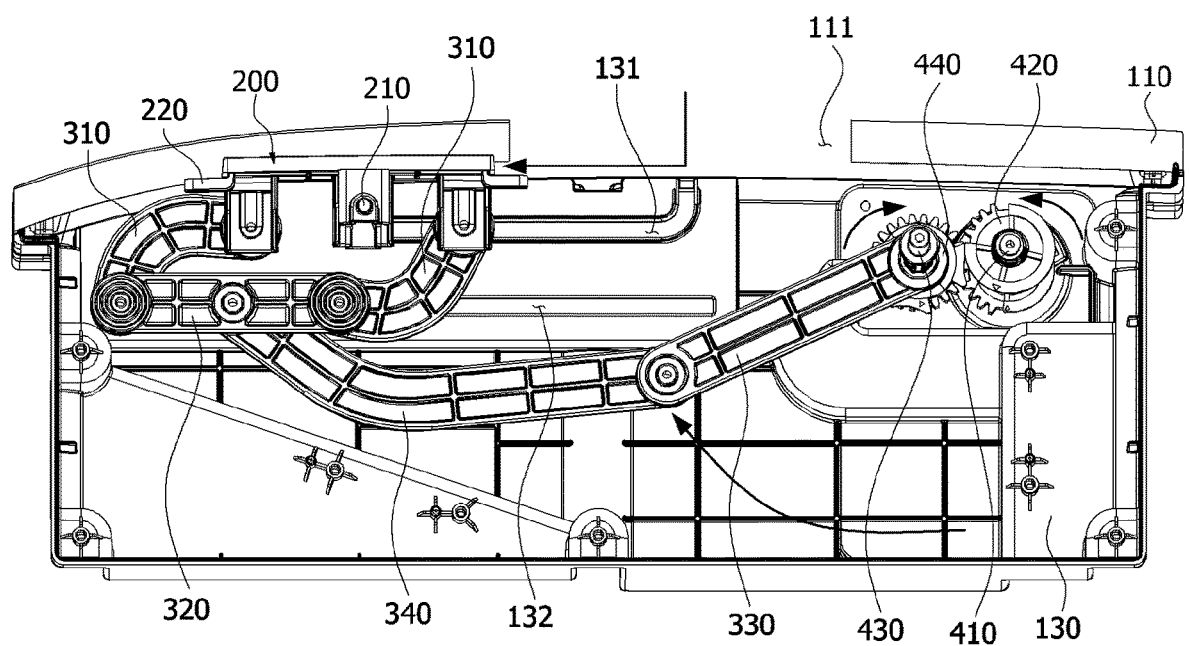

Accordingly, as illustrated in FIGS. 5 and 6, in a state in which the door 200 is disposed at the opening 111 to close the opening 111, the door 200 may open the opening 111 by moving rearward toward the inside of the housing 100 along the second movement section L2 and moving to the right (or left) along the first movement section L1, and may be hidden on the back of the front cover 110. In addition, the door 200 may close the opening 111 by moving to the left (or right) along the first movement section L1 and moving forward toward the outside of the housing 100 along the second movement section L2.

The door 200 may have a stopper 220 on each of both side surfaces.

The stopper 220 may serve to prevent the door 200 from further advancing by being provided to contact the back of the front cover 110 in the state in which the door 200 is disposed at the opening 111 to close the opening 111.

Sliding movement of the door 200 may be implemented through the door link unit 300 and the gear unit 400.

The door link unit 300 may be connected to the door 200 and configured to slide the door 200.

Referring to the drawings, the door link unit 300 may include a guide link 310, a connecting link 320, a first door driving link 330, and a second door driving link 340.

A pair of guide links 310 may be provided.

One ends of the guide links 310 may be rotatably connected to one side and the other side of a bottom surface of the door 200, respectively, with respect to the guide pin 210, and the other ends thereof may be provided with sliding pins 311 and connected to the sliding groove 132 provided in the lower cover 130 of the housing 100. The sliding pin 311 may be provided in a structure that protrudes downward from a lower surface of the guide link 310 at the other end thereof.

One end and the other end of the connecting link 320 may be rotatably connected to the other ends of the pair of guide links 310, respectively. In this case, the connecting link 320 may be connected to the other surfaces of the guide links 310 opposite to the surfaces where the sliding pin 311 is provided at the other ends of the guide links 310. That is, the connecting link 320 may be connected to an upper surface of the guide link 310 at the other end thereof.

The first door driving link 330 may be connected to the gear unit 400 and rotate by power of an actuator 500 transmitted through the gear unit 400. In an example, the first door driving link 330 may have one end connected to a second gear 440 of the gear unit 400 and rotate together with the second gear 440 using the second gear 440 as a rotation axis.

The second door driving link 340 may have one end rotatably connected to the other end of the first door driving link 330, and the other end may be rotatably connected to the connecting link 320.

The second door driving link 340 implements sliding movement of the door 200 in the left-right direction by converting a rotational movement of the first door driving link 330 into a linear movement in the left-right direction based on the opening 111 in conjunction with the connecting link 320 and causing the guide link 310 to linearly reciprocate along the sliding groove 132 together with the connecting link 320. In this case, the door 200 slides while maintaining a state in which its front surface faces forward.

The gear unit 400 may include a first gear unit 401 and a second gear unit 402.

Figure 7:
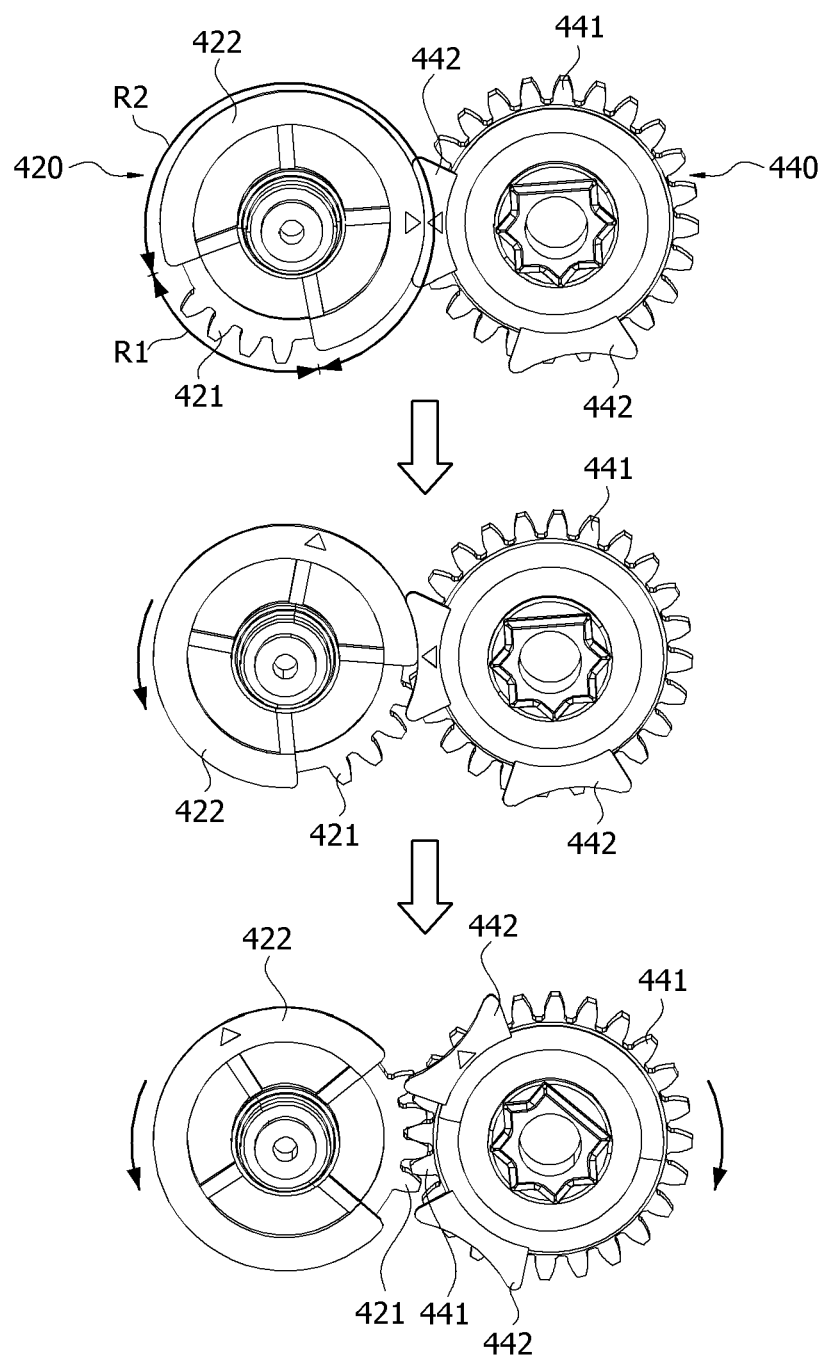
FIG. 7 is a view illustrating operation of a second lower gear in an operating section and an idling section of a first lower gear.
Figure 8:
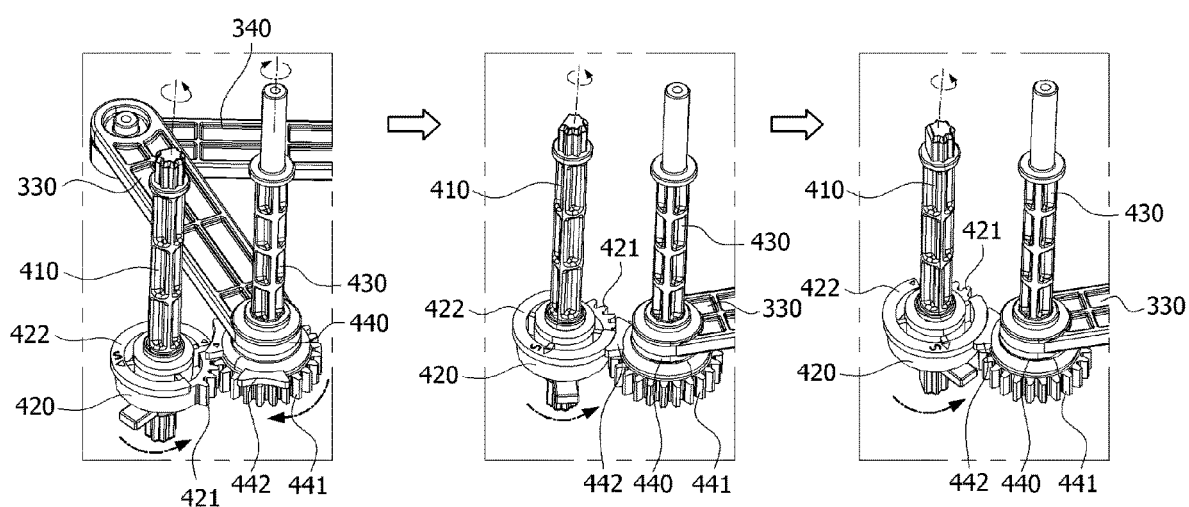
FIG. 8 is a view illustrating operation of the second lower gear according to rotation of the first lower gear.

Referring to FIGS. 7 and 8 together with FIG. 3, the first gear unit 401 may rotate by being connected to the actuator 500, and the second gear unit 402 may transmit power of the actuator 500 to the door link unit 300 by being connected to the first gear unit 401.

The first gear unit 401 may include a first shaft 410 connected to the actuator 500 and a first gear 420 provided on the first shaft 410. The first gear 420 is fitted and fixed to the first shaft 410 and is configured to rotate integrally with the first shaft 410.

The second gear unit 402 may include a second shaft 430 disposed in parallel with the first shaft 410 and a second gear 440 provided on the second shaft 430. The second gear 440 is rotatably connected to the second shaft 430 and is configured to rotate individually.

The first gear 420 and the second gear 440 may be engaged with each other.

In addition, the second gear 440 may be connected to the door link unit 300. Specifically, the second gear 440 may be connected to the first door driving link 330 of the door link unit 300. In this case, the first door driving link 330 may be fitted to the second gear 440 and form binding.

The first shaft 410 rotates as one end thereof is connected to the actuator 500, and the first gear 420 integrally rotates together with the first shaft 410. Then, the second gear 440 engages with the first gear 420 and rotates about the second shaft 430.

An outer circumferential surface of the first gear 420 may be divided into an operating section R1 where first teeth 421 are formed and an idling section R2 where a rim 422 is formed. Specifically, the first teeth 421 may be formed in a section that is a part of the outer circumferential surface of the first gear 420, and the rim 422 may be formed in a remaining section. In addition, a part of the section where the first teeth 421 are formed may correspond to the operating section R1, and the remaining section where the rim 422 is formed may correspond to the idling section R2.

The rim 422 may be formed in a structure that protrudes radially from an upper portion of the first teeth 421. That is, the rim 422 may be positioned at a higher level than the first teeth 421. In addition, the rim 422 may have a protruding curved surface in an arc shape on its outer surface.

The second gear 440 may include second teeth 441 formed on an outer circumferential surface thereof and engaged with the first teeth 421 and a contactor 442 contacting the rim 422. Specifically, the second teeth 441 may be formed along the outer circumferential surface of the second gear 440, and the contactor 442 may be formed in a structure that protrudes radially from an upper portion of the second teeth 441.

In an example, at least one contactor 442 may be provided in a section that is a part of the outer circumferential surface of the second gear 440. The present example illustrates that two contactors 442 are provided spaced apart at a predetermined interval, but is not limited thereto. In addition, the contactor 442 may have an outer surface that is concave and curved in an arc shape corresponding to a shape of the outer surface of the rim 422.

As the first gear 420 rotates, the first teeth 421 engages with the second teeth 441 of the second gear 440 in the operating section R1, so that the second gear 440 rotates. That is, as the first teeth 421 engage with the second teeth 441 in the operating section R1, the second gear 440 rotates together with the first gear 420.

In addition, the rim 422 of the first gear 420 contacts the contactor 442 and slips in the idling section R2, so that the second gear 440 does not rotate. That is, in the idling section R2, as the second teeth 441 do not engage with the first teeth 421 and the contactor 442 and the rim 422 slide against each other in a state of being in contact with each other, the second gear 440 does not rotate, and the first gear 420 idles.

Accordingly, as the second gear 440 rotates in the operating section (R1) of the first gear 420, the door link unit 300 also operates, and thus the door 200 slides. In addition, as the second gear 440 does not rotate in the idling section R2 of the first gear 420, the door link unit 300 also does not operate, and thus the door 200 maintains a stopped state.

The operation of opening and closing the opening of the door system 1 according to an embodiment of the present invention will be described with reference to FIGS. 9 and 10.

Figure 9:
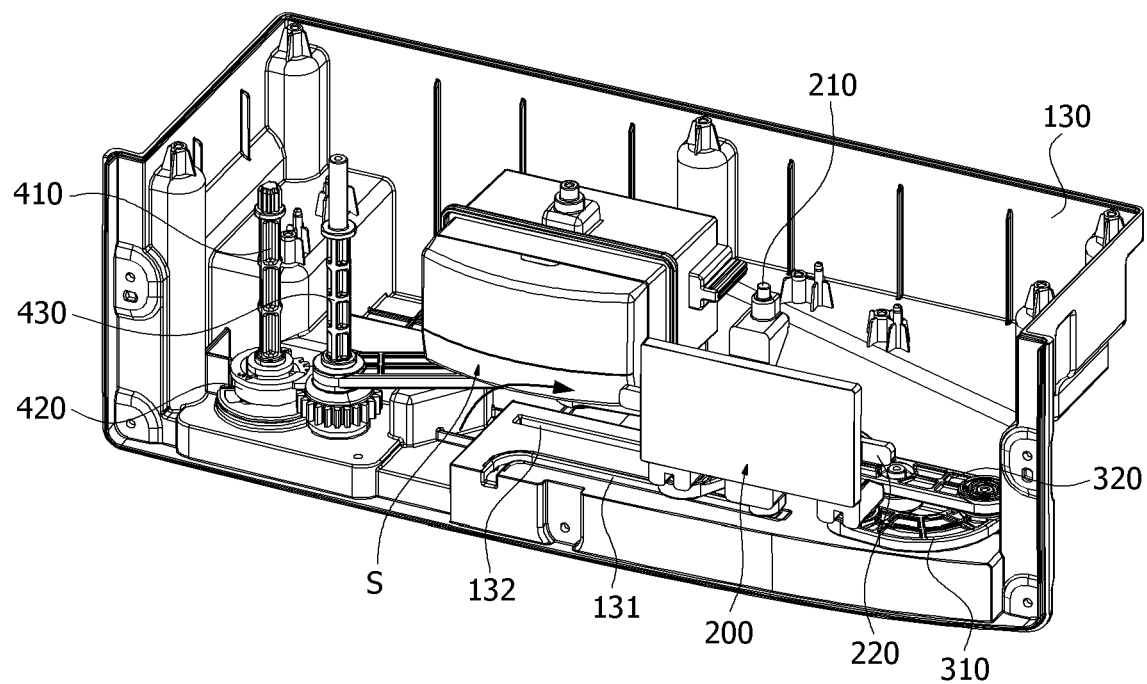
FIG. 9 is an operational view illustrating a state in which the door is open.
Figure 10:
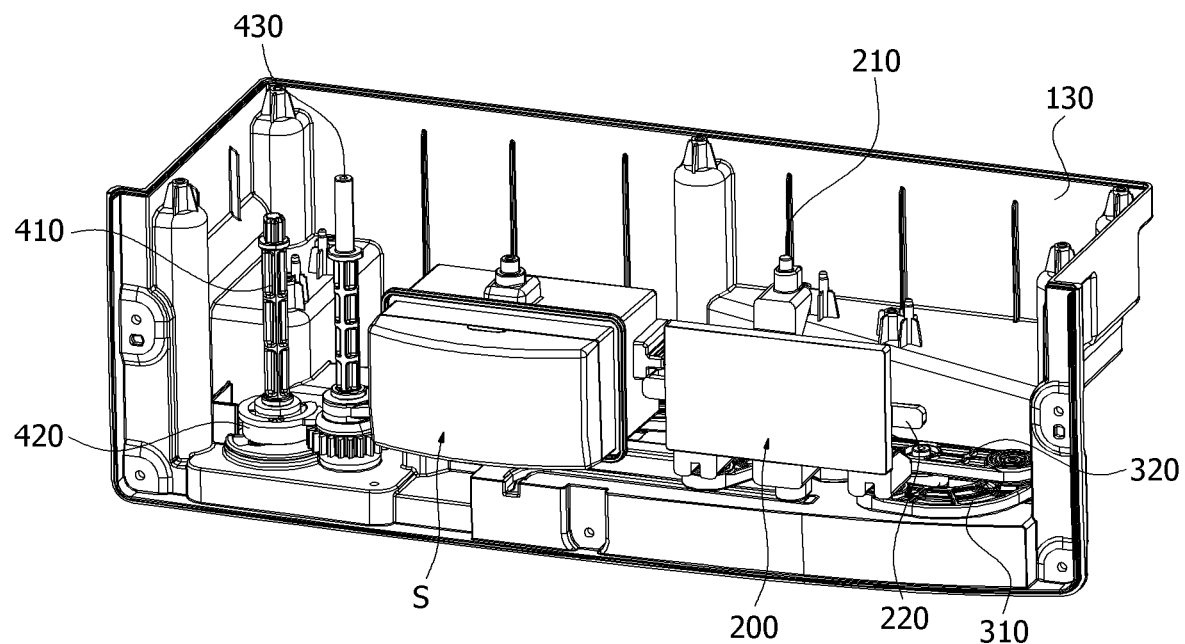
FIG. 10 is an operational view illustrating a state in which the sensor is deployed to the outside by passing through the opening.

FIG. 9 is an operational view illustrating a state in which the door is open, and FIG. 10 is an operational view illustrating a state in which the sensor is deployed to the outside by passing through the opening.

As illustrated in FIG. 9, when the autonomous driving mode starts and the first gear unit 401 rotates by the operation of the actuator 500, the second gear 440 engaged with the first gear 420 in the operating section R1 rotates and moves the door link unit 300, and the door 200 connected to the door link unit 300 slides, so that the opening 111 is opened.

That is, in a state in which the door 200 is disposed at the opening 111 to close the opening 111, the door 200 opens the opening 111 by moving rearward toward the inside of the housing 100 along the second movement section L2 and moving to the right along the first movement section L1, and is hidden on the back of the front cover 110.

As illustrated in FIG. 10, when the first gear 420 in the idling section R2 and the second gear 440 are engaged in a state in which the door 200 opens the opening 111, as the first gear 420 idles, the second gear 440 does not rotate and remains stationary, and accordingly, the door link unit 300 does not operate, so that the door 200 maintains the stopped state.

In addition, the sensor S stored inside the housing 100 may move forward through the open opening 111 and be deployed to the outside.

Then, when the autonomous driving mode is ended and the sensor S is stored inside the housing 100, the actuator 500 operates and the first gear unit 401 rotates in the opposite direction, and as the second gear 440 engaged with the first gear 420 rotates, the door link unit 300 operates and slides the door 200, so that the opening 111 is closed.

That is, the door 200 closes the opening 111 by moving to the left along the first movement section L1 and moving forward toward the outside of the housing 100 along the second movement section L2.

As described above, according to an embodiment of the present invention, by configuring the sensor to be selectively deployed outside a vehicle or stored inside the vehicle depending on a driving mode of the vehicle, it is possible to prevent the performance of the sensor from deteriorating due to contamination by external foreign substances.

In addition, by blocking the opening through which the sensor is deployed to the outside with the door in a state in which the sensor is stored, it is possible to protect the sensor from external environments and to prevent occurrence of a design difference on the exterior of the vehicle due to the opening being opened.

According to an embodiment of the present invention, it is possible to prevent a sensor from being contaminated by deploying the sensor to the outside of a vehicle only when sensor operation is required, such as in an autonomous driving mode.

An effect of the present invention is not limited to that mentioned above, and other effects not mentioned will be clearly understood by those skilled in the art from the description of claims.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A door system for opening and closing an opening for entrance and exit of a sensor for vehicles, the door system comprising:
a housing configured to accommodate the sensor for vehicles therein and having an opening for entrance and exit of the sensor;
a door configured to slide along a guide groove provided on the housing to open and close the opening;
a door link unit configured to slide the door; and
a gear unit configured to transmit power of an actuator to the door link unit,
wherein the gear unit includes:
a first gear unit including a first shaft connected to the actuator and a first gear provided on the first shaft; and
a second gear unit including a second shaft disposed in parallel with the first shaft and a second gear provided on the second shaft and engaged with the first gear; and
wherein the door link unit includes a pair of guide links, one ends of which are rotatably connected to one side and the other side of a bottom surface of the door and the other ends of which are provided with sliding pins and connected to a sliding groove provided in a lower portion of the housing, a connecting link having one end and the other end rotatably connected to the other ends of the pair of guide links, a first door driving link having one end connected to the second gear and rotating together with the second gear, and a second door driving link having one end rotatably connected to the other end of the first door driving link and the other end rotatably connected to the connecting link.

2. The door system of claim 1, wherein an outer circumferential surface of the first gear is divided into an operating section in which first teeth are formed and an idling section in which a rim is formed, the second gear includes second teeth formed on an outer circumferential surface thereof and engaged with the first teeth and a contactor contacting the rim, and the rim and the contactor are provided in structures that protrude radially from upper portions of the first teeth and the second teeth, respectively.

3. The door system of claim 2, wherein as the first gear rotates, the first teeth engage with the second teeth in the operating section so that the second gear rotates, and the rim is configured to contact the contactor and slide in the idling section so that the second gear does not rotate.

4. The door system of claim 2, wherein the rim has an outer surface that protrudes and is curved in an arc shape, and the contactor has an outer surface that is concave and curved in the arc shape.

5. The door system of claim 1, wherein the sliding pin is provided in a structure that protrudes downward from a lower surface of the guide link at the other end thereof.

6. The door system of claim 5, wherein the connecting link is connected to an upper surface of the guide link at the other end thereof.

7. The door system of claim 1, wherein the second door driving link converts a rotational movement of the first door driving link into a linear movement in conjunction with the connecting link.

8. The door system of claim 1, wherein the guide groove includes a first movement section straightly disposed in a left-right direction behind the opening and a second movement section curvedly extending in a front-rear direction from the first movement section toward the opening.

* * * * *